United States Patent [19]
Kim

[11] Patent Number: 5,999,361
[45] Date of Patent: Dec. 7, 1999

[54] SERVO CONTROL DEVICE AND METHOD USING A MINIMAL BIAS TABLE FOR DISPLACEMENT CONTROL OF A PLANT RESPONSIVE TO BIAS FORCES

[75] Inventor: Kwan-Il Kim, Seongnam, Rep. of Korea

[73] Assignee: SamSung Electronics Co., Ltd., Suwon, Rep. of Korea

[21] Appl. No.: 08/840,619

[22] Filed: Apr. 30, 1997

[30] Foreign Application Priority Data

Apr. 30, 1996 [KR] Rep. of Korea ............... 96/13896

[51] Int. Cl.⁶ ........................................... G11B 5/55
[52] U.S. Cl. ........................... 360/78.09; 360/78.04
[58] Field of Search .................. 360/78.09, 77.04, 360/78.04, 78.06, 78.07; 318/561

[56] References Cited

U.S. PATENT DOCUMENTS

| | | | |
|---|---|---|---|
| 4,532,562 | 7/1985 | Powell | 360/78.07 |
| 4,536,809 | 8/1985 | Sidman | 360/77.04 |
| 4,677,507 | 6/1987 | Elliot | 360/78.07 |
| 4,949,201 | 8/1990 | Abed | 360/78.07 |
| 5,062,023 | 10/1991 | Squire | 360/78.04 |
| 5,369,345 | 11/1994 | Phan et al. | 360/78.09 X |
| 5,404,253 | 4/1995 | Painter | 360/78.09 X |
| 5,576,909 | 11/1996 | Dierkes et al. | 360/78.09 |
| 5,585,976 | 12/1996 | Pham | 360/78.09 X |
| 5,773,948 | 6/1998 | Kim et al. | 360/78.04 X |

*Primary Examiner*—Aristotelis M. Psitos
*Assistant Examiner*—James L Habermehl
*Attorney, Agent, or Firm*—Robert E. Bushnell, Esq.

[57] ABSTRACT

A servo control device for controlling a plant to generate the position information, comprises an initial bias value storage unit for updating the initial bias value with a bias value corresponding to the current position information, and an estimation unit for making an estimation of the current position, velocity, and disturbance, wherein the estimation unit increases the internal bias gain value, restores the increased internal bias gain value to the original value when settling is started, produces the disturbance estimation value corresponding to the gain value, and uses the disturbance estimation value as the initial settling value in response to a long seek stroke command, or uses the previous initial bias value of the preceding seek stroke updated by the initial bias value storage unit as the initial settling value in response to a short seek stroke command.

52 Claims, 3 Drawing Sheets

SERVO CONTROL DEVICE AND METHOD USING A MINIMAL BIAS TABLE FOR DISPLACEMENT CONTROL OF A PLANT RESPONSIVE TO BIAS FORCES

This application makes reference to, incorporates the same herein, and claims all benefits accruing under 35 U.S.C. §119 from an application for SERVO CONTROL DEVICE AND METHOD FOR MINIMIZING THE BIAS TABLE FOR POSITION COMPENSATION IN A HARD DISK DRIVE earlier filed in the Korean Industrial Property Office on Apr. 30$^{th}$, 1996 and there duly assigned Ser. No. 13896/1996, a copy of which application is annexed hereto.

BACKGROUND OF THE INVENTION

1. Field of the Invention

The present invention relates to the field of displacement control of plants that respond to one or more bias forces, and in particular to the field of controlling such plants with compensation for those bias forces. More particularly, the present invention has application in bias-compensating control of a head actuator in a magnetic storage disk drive.

2. Description of the Related Art

Many mechanical and electromechanical systems operating with automatic control systems include actuators that respond, or are affected by, one or more bias forces that perturb the actual position or velocity of the actuator away from the position or velocity expected by the control system. In the case of a magnetic storage disk drive, the actuator may be a head actuator for positioning the read-write heads of the disk drive over a desired data track on a rotating disk in the disk drive. Bias forces on such a head actuator may include the gravitational force exerted upon the head and actuator as they are positioned over a track, wind generated by the spinning disk, stress from the cable that usually transfers data between the head and the stationary portion of the disk drive, and so forth.

These bias forces are frequently described as disturbances because they cause the head actuator in the disk drive, or the actuator in the more general system, to respond inaccurately to a control instruction to assume a given position. This inaccuracy necessitates iterative adjustment by the control system to bring the actuator to the desired position, and this adjustment process delays completion of the positioning operation. Thus, modern control systems for plants subject to bias forces desirably compensate for those forces when generating control signals.

Two methods exist for compensating for a disturbance W. The first method involves calculating a compensation value to be injected into the control signal. Calculation of such compensation values requires detailed knowledge of a predictable relationship between the positions the actuator may assume and the disturbances it will experience in those positions. This method has the drawback that because the calculation process takes time, it delays the positioning operation when the target position lies only a short distance from the actuator's current position.

The second and more widely used method calculates disturbance estimation values in advance and stores them in a bias table for later use. This approach also has drawbacks in that it requires an initial calculating process to create the bias table and a separate memory area to store the bias table.

The significance of compensating for bias forces in controlling an actuator has been recognized previously. However, an approach has not heretofore been proposed that provides accurate disturbance compensation with rapid seek response but without requiring substantial storage capacity to store a bias table. For example, U.S. Pat. No. 5,585,976, entitled "Digital Sector Servo Incorporating Repeatable Run Out Tracking" and granted to Pham, discloses digital servo control system for controlling the head of a disk drive. The system compensates for repeatable run out during a seek operation by adding to the control signal a feed forward signal taken from memory. The system uses a plant model to generate predicted values for position, velocity, and bias force. However, in seek mode this system does not take advantage of the differences between long seeks and short seeks in its process for producing predicted bias force values.

Similarly, U.S. Pat. No. 5,404,253, entitled "Estimator-Based Runout Compensation in a Disk Drive" and granted to Painter, shows a disk drive controller that compensates for bias forces; however, the bias force estimation process does not differentiate between long seek operations and short seek operations. U.S. Pat. No. 5,369,345, entitled "Method and Apparatus for Adaptive Control" and granted to Phan et al., discloses an adaptive control system applicable to a disk drive servo actuator apparatus. This system also generates predicted values for position, velocity, and bias force and calculates a compensated control signal using a predicted value for bias force generated by an estimator algorithm. However, the control signal calculation process does not distinguish between long seeks and short seeks.

U.S. Pat. No. 4,949,201, entitled "Disk Drive Head Position Controller with Static Bias Compensation and Plural Velocity Detectors" and granted to Abed, is incorporated herein by reference and a copy of which is annexed hereto. This patent shows a system for accurately and rapidly positioning the head of a hard disk drive. The disclosed system specifically compensates for bias force values in the generation of control signals. The bias values may be computed ahead and stored in RAM; computed by the controller processor during an initialization phase, using a plant model; or computed by the controller processor as needed during seek maneuvers.

The Abed system distinguishes between high velocity and low velocity modes, with the distinction based on the number of tracks the head must move during a seek operation. However, the control signal generation process does not utilize this distinction in generating bias values. Indeed, this system uses a fill-in gain unit instead of scaling the bias values for the low velocity mode.

Thus, a need has existed for an actuator control system, and particularly such a system that is applicable to magnetic disk storage devices, that accurately compensates for bias forces experienced by the actuator but does not sacrifice either response speed or data storage capacity to do so.

SUMMARY OF THE INVENTION

Accordingly, it is an object of the present invention to provide a servo control device that compensates for bias forces experienced by a plant while using a minimal bias table and achieving rapid response.

It is another object of the present invention to provide a servo control device that achieves rapid response by omitting the initial calculating process for servo control with bias compensation and thereby enabling rapid control for short displacement operations.

It is yet another object of the present invention to provide a servo control device and method for use in magnetic storage disk drives that achieves rapid response in seek operations, both long and short, by adapting the process for generating bias values to the length of the seek operation, thereby achieving rapid response for short seeks without utilizing substantial data storage capacity.

According to a first embodiment of the present invention, a servo control device is provided for controlling a plant during execution of a displacement operation, where the plant is responsive to a bias force and generates position information. The servo control device includes an initial bias value storage unit for storing a bias value corresponding to a current position as an initial bias value. The device also includes an estimation unit, in communication with the initial bias value storage unit, for receiving a mode signal and producing a disturbance estimation value in accordance with the mode signal.

According to another embodiment of the present invention, the estimation unit determines from the mode signal whether the displacement operation corresponds to a long displacement. When the displacement operation corresponds to a long displacement, the estimation unit produces the disturbance estimation value in dependence upon a position value representative of a current position. When the displacement operation does not correspond to a long displacement, the estimation unit obtains the initial bias value from the initial bias value storage unit and uses it as the disturbance estimation value.

According to a further embodiment of the present invention, the estimation unit may increase an internal bias gain value from an original value to an increased value and produce the disturbance estimation value in correspondence with the increased value when the displacement operation corresponds to a long displacement. Also, the estimation unit may use the disturbance estimation value as an initial settling value and restore the internal bias gain value from the increased value to the original value when the plant has started to settle, in the case when the displacement operation corresponds to a long displacement.

According to another embodiment of the present invention, a servo control device is provided wherein the plant is a head actuator operating in a mass storage device and the displacement operation is a head movement operation. The mass storage device may be a magnetic storage disk drive operating in conjunction with one or more storage disks, and each of the disks may include a plurality of data tracks disposed circumferentially on a surface of the disk. The servo control device may further include a switch connecting the initial bias storage unit with the estimation unit and adapted to receive a displacement signal and respond in accordance with the signal. The displacement signal may be a seek signal that indicates that the seek operation does not correspond to a long seek. When the seek signal so indicates, the estimation unit obtains the initial bias value stored in the initial bias value storage unit through the switch when the mode signal, which may be a seek stroke signal, indicates that the seek operation does not correspond to a long seek.

In a further embodiment of the present invention, the servo control device may control a head actuator in a disk drive having one or more disks with a plurality of data tracks on each disk. The servo control device may determine that the head movement operation corresponds to a long seek when the head movement operation involves moving the head actuator across at least a predetermined number of tracks. The predetermined number of tracks may be a number between 32 and 256. The predetermined number of tracks may be a number between 32 and 128. In a preferred embodiment, the predetermined number of tracks is 64.

According to another embodiment of the present invention, a servo control method is provided for controlling a plant that responds to a bias force and generates position information, where the control takes place during execution of a displacement operation. The method includes the steps of receiving a mode signal and determining from the mode signal whether the displacement operation corresponds to a long displacement. The method also includes the step of producing a disturbance estimation value in dependence upon an initial bias value stored in an initial bias value storage unit and corresponding to a current position when the displacement operation does not correspond to a long displacement.

The method may also include the step of producing the disturbance estimation value in dependence upon a position estimation value representative of a current position when the displacement operation corresponds to a long displacement. The step of producing a disturbance estimation value when the mode signal indicates that the displacement operation does not correspond to a long displacement may also include using the initial bias value as the disturbance estimation value. Further, in the case of a long displacement, the step of producing a displacement estimation value may include increasing an internal bias gain value from an original value to an increased value to produce the displacement estimation value. The displacement estimation value may be used as an initial settling value, and the method may determine whether the plant has started to settle in accordance with the initial settling value. Also, the method may restore the internal bias gain value from the increased value to the original value when the plant has started to settle.

In another embodiment of the present invention, a servo control method is provided wherein the plant is a head actuator operating in a mass storage device, and the mass storage device may be a magnetic storage disk drive. The disk drive may include one or more disks, each disk having a plurality of data tracks on a surface of the disk. In the method, a head movement operation may correspond to a long seek operation when the head movement operation involves moving the head actuator across at least a predetermined number of data tracks. The predetermined number of data tracks may be a number between 32 and 256. The predetermined number of data tracks may be a number between 32 and 128. In a preferred embodiment, the predetermined number of data tracks is 64.

According to another embodiment of the present invention, a servo control device for controlling a plant to generate the position information, comprises an initial bias value storage unit for updating the initial bias value with a bias value corresponding to the current position information, and an estimation unit for making an estimation of the current position, velocity, and disturbance, wherein the estimation unit increases the internal bias gain value, restores the increased internal bias gain value to the original value when settling is started, produces the disturbance estimation value corresponding to the gain value, and uses the disturbance estimation value as the initial settling value in response to a long seek stroke command, or uses the previous initial bias value of the preceding seek stroke updated by the initial bias value storage unit as the initial settling value in response to a short seek stroke command.

The present invention includes disk drive servo control devices and methods as particular embodiments, but it is applicable to a broad range of control systems for plants subject to bias forces during execution of displacement operations. The description provided hereinbelow addresses principally disk drive embodiments of the present invention as illustrative examples, but it will be recognized by persons of ordinary skill in the servo control arts that the present invention encompasses control systems for a broad range of mechanical and electromechanical systems.

The present invention will now be described more specifically with reference to the drawing figures, although the drawing figures are attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
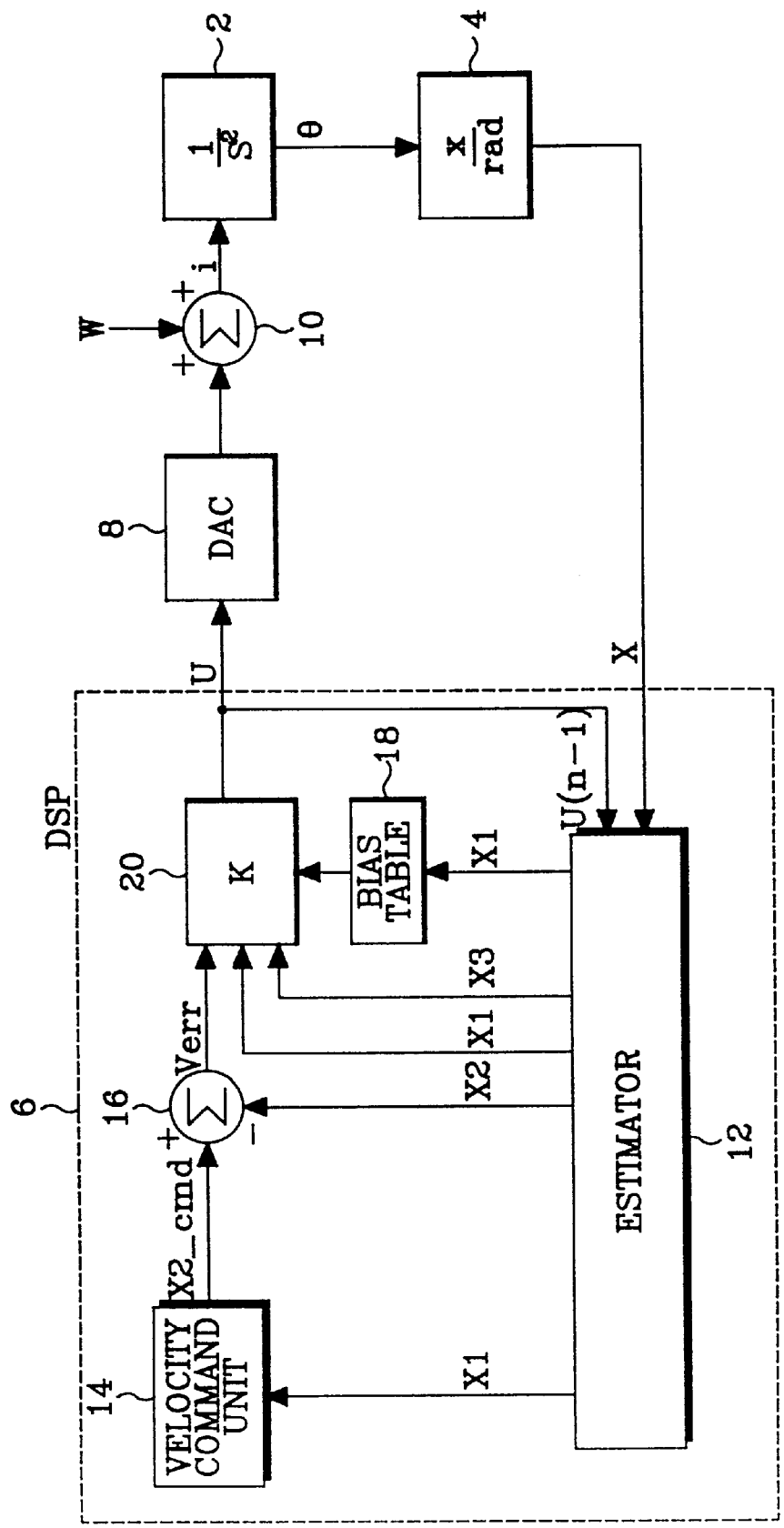
FIG. 1 is a block diagram for illustrating a servo control device for a hard disk drive.

Referring to FIG. 1, the servo control device consists of a plant 2 intended to be subjected to servo control, an angle/position converter 4, a DSP (digital signal processor) 6, a DAC (digital to analog converter) 8, and an adder 10. The rational function of s shown for plant 2 is simply an exemplary formula which represents the DC motor characteristics expressed as a Laplace transform.

The above plant 2 outputs the angular information (expressed as, e.g., a radian value) θ of the motor rotation to the angle/position converter 4, which converts the angular information θ into position information X, which is further transmitted to DSP 6.

The DSP 6 consists of an estimator 12, a velocity command unit 14, an adder 16, a bias table 18, and a gain function unit 20. The estimator 12 receives the position information X from the angle/position converter 4 and the previous current command value U(n−1) from the gain function unit 20 to calculate the position, velocity, and disturbance estimations by means of an estimation calculating function, thereby outputting the resulting values, i.e. the respective position, velocity, and disturbance estimations values X1, X2, X3. The above velocity command unit 14 responds to the position estimation value X1 to output the velocity command value X2_cmd to the adder 16.

The adder 16 subtracts the above velocity estimation value X2 from the velocity command value X2_cmd to output the velocity error value Verr to the gain function unit 20. The above gain function unit 20 receives the velocity error value Verr from the adder 16, the position estimation value X1 from the estimator 12, and the disturbance estimation value X3 from the estimator 12 and the bias value from the bias table 18 according to the control of the estimator 12 and controls the respective gains by means of a transfer function expressed in terms of K1, K2, and K3. The gain function unit 20 outputs the current command value U for applying servo control to plant 2.

The DAC 8 converts the current command value U into an analog value, from which adder 10 generates the drive current value i to be sent to the plant 2. Accordingly, the plant 2 is controlled to be driven in response to the above drive current value i. The letter "W" as shown in FIG. 1 represents a disturbance value.

Methods for compensating for disturbances (or bias forces) will now be considered in the context of FIG. 1. A first method uses estimator 12 to calculate a compensation value for the disturbance W and outputs a resulting disturbance value X3. However, this method has the drawback that since the estimator 12 responds relatively slowly when seeking over a short interval, the seek time becomes longer. A second method calculates the disturbance estimation values for compensating the disturbance W in advance and stores them in the bias table 18 for later use. This method has the drawbacks that an initial calculating process is needed to create the bias table 18 and a separate memory area is required for storing the disturbance estimation values in the bias table 18.

Figure 2:
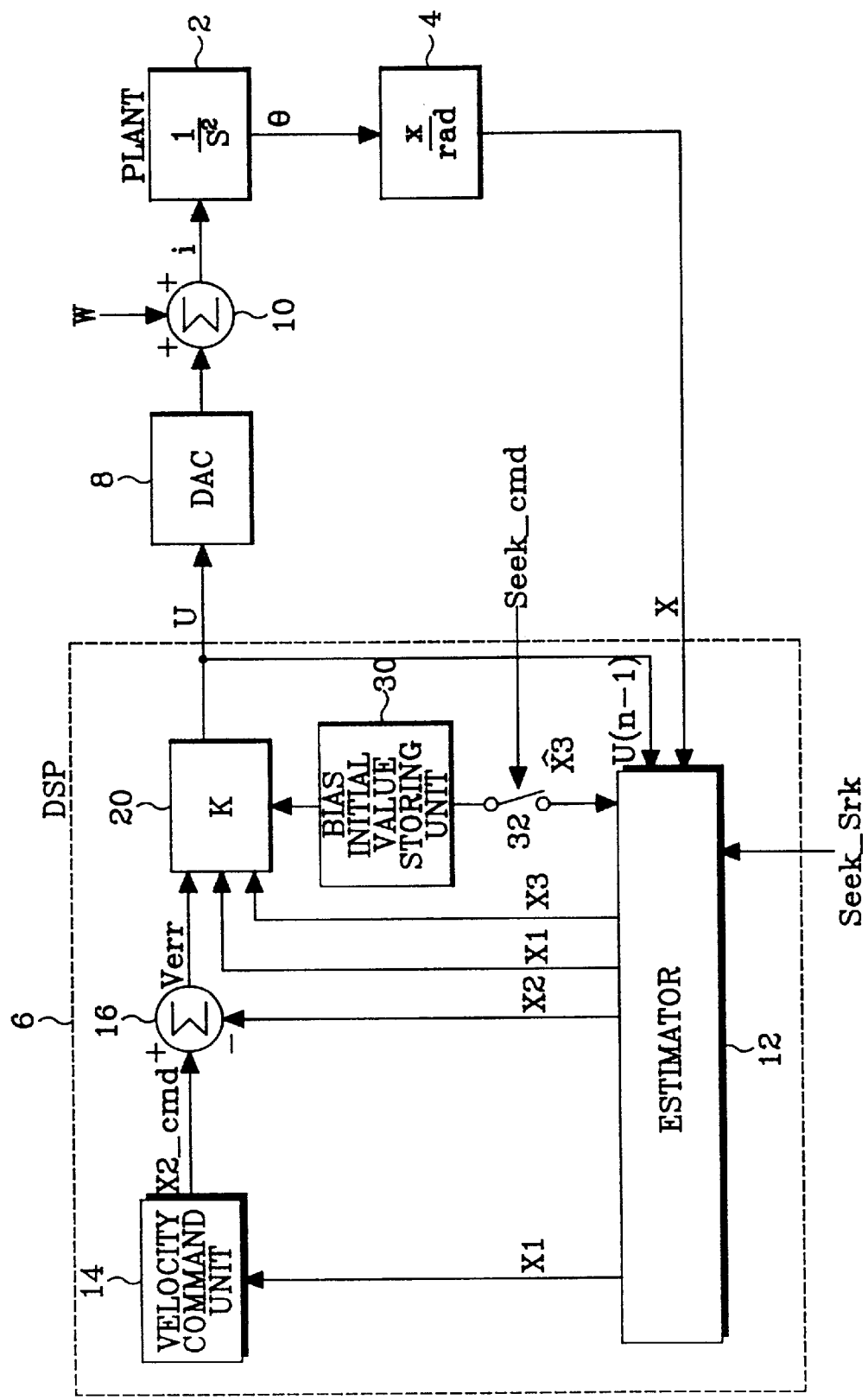
FIG. 2 is a block diagram for illustrating a servo control device for a hard disk drive according to an embodiment of the present invention.

Referring now to FIG. 2, a servo control device embodying an aspect of the present invention comprises an initial bias value storage unit 30 and a switch 32 in addition to the constituent elements as shown in FIG. 1. The initial bias value storage unit 30 updates the current position's bias value, i.e. the disturbance estimation value X3 calculated by the estimator 12 in every seek operation on the above initial bias value. For example, the initial bias value storage unit 30 according to one embodiment of the present invention may include a register having a one-word length. A switch 32 is located between the initial bias value storage unit 30 and the estimator 12 to be switched on in response to a seek command Seek_Cmd from an external microcontroller (not shown).

The operation of a servo control device and method according to one embodiment of the present invention will now explained with reference to FIG. 2. For an initial seek operation, estimator 12 calculates a bias value (i.e., a disturbance estimation value X3) corresponding to the current position and provides this bias value to the initial bias value storage unit 30. Thereafter, the initial bias value storage unit 30 provides a previously-stored initial bias value to the estimator 12 through the switch 32. Switch 32 is activated (switched on) in response to a displacement signal, which may be a seek signal Seek_Cmd applied by the external microcontroller (not shown).

Estimator 12 then performs position, velocity, and disturbance estimations by employing different estimation processes depending upon whether the seek interval is long or short.

The long seek mode of the estimator 12 operates in the following manner. Estimator 12 receives a seek stroke signal Seek_Srk from the external microcontroller (not shown) that indicates that the seek operation will be long. Estimator 12 then increases the internal bias gain value, which provides rapid seeking response, and performs the position, velocity, and disturbance estimations. In this case, the position and velocity estimation values, X1 and X2, are computed and applied to the velocity command unit 14 and the adder 16, respectively. The disturbance estimation value X3 is computed and applied both to the gain function unit 20 and the initial bias value storage unit 30.

Thereafter, when settling has started, estimator 12 restores to its original value the internal bias gain value, which was increased to an increased value at an earlier stage of the seek operation. Estimator 12 also adjusts the disturbance estimation value X3 in accordance with the change in the initial bias gain value. This adjustment of X3 prepares X3 to be used as the initial settling value. Upon completing the seek operation, the disturbance estimation value X3 is stored in the initial bias value storage unit 30 as the initial bias value for the next seek operation.

The short seek mode of estimator 12 operates in a different manner. When estimator 12 receives a seek stroke signal Seek_Srk indicating a short seek operation, estimator 12 achieves rapid response in the seek operation by receiving the initial bias value stored in the initial bias value storage unit 30 (i.e. the disturbance value X3 stored in the preceding seek operation) through the switch 32. In this case, estimator 12 uses this same initial bias value for the initial settling value (the disturbance estimation value for the current seek operation). In the preferred embodiment, the seek stroke signal indicates a long seek stroke when the seek operation will move the head to a track at least 64 tracks away from the current track. However, a predetermined number of data tracks other than 64 may be used to define when a seek stroke is long for purposes of this embodiment of the present invention. For example, the predetermined number may be a number between 32 and 256, or it may be a number between 32 and 128.

Estimator 12 then performs the position, velocity, and disturbance estimations by using the initial bias value obtained from the initial bias value storage unit 30 as the initial settling value. Because the bias value of the target (or objective) position for a short seek operation is approximately equal to the bias value previously stored in the initial bias value storage unit 30, the estimator 12 uses the previous bias value, thereby achieving rapid response in short seeks. In this case, the internal bias gain value remains unchanged from its original value. Thus, the disturbance estimation value X3 is calculated directly and is stored in the initial bias value storage unit 30 upon completion of the seek operation.

Figure 3:
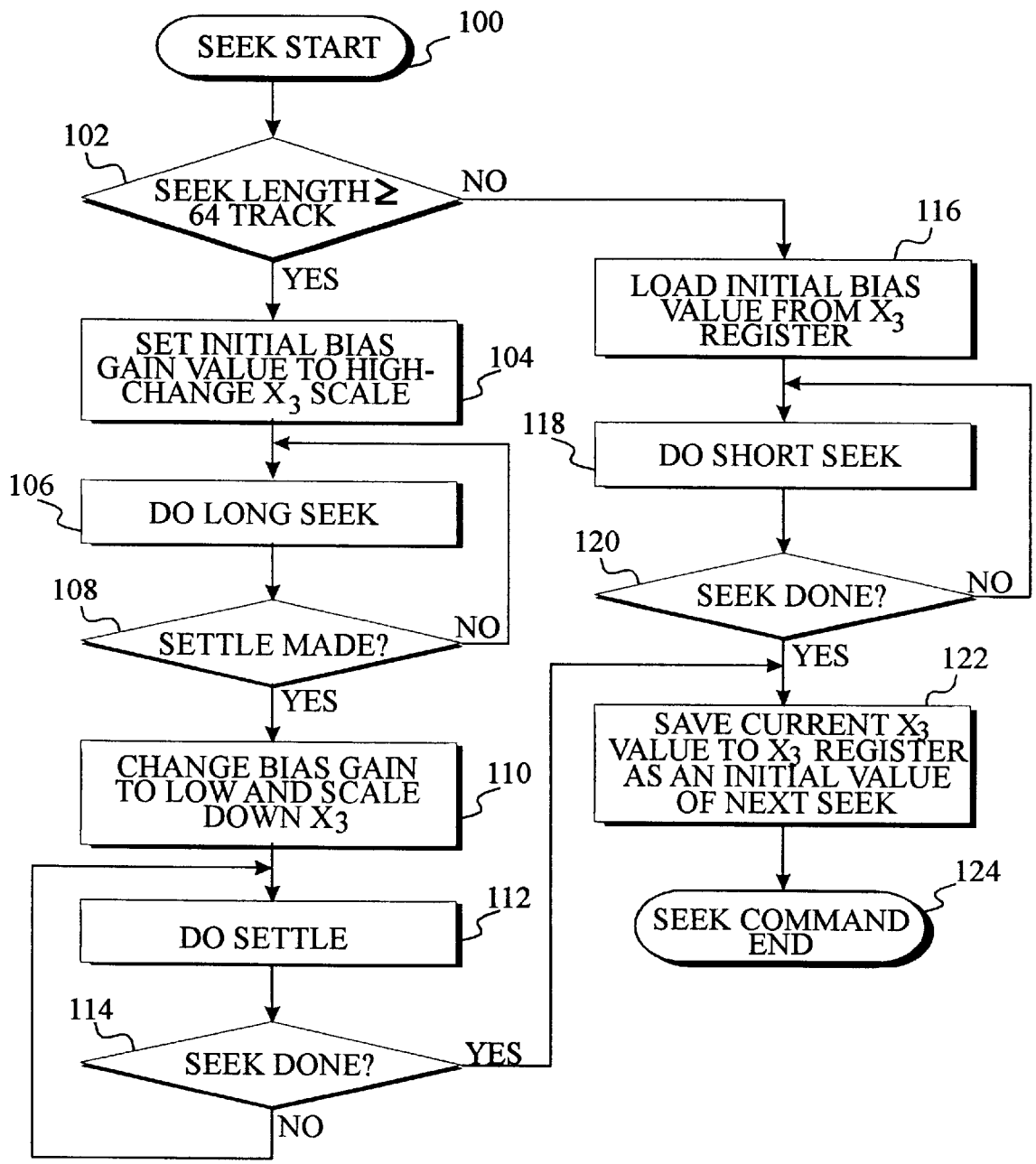
FIG. 3 is a flow diagram illustrating the operation of the servo control device and method of according to an embodiment of the present invention.

FIG. 3 illustrates in sequential form the primary stages in the operation of the long seek and short seek modes of the present invention as applied to disk drives. Seek Start 100 initiates the seek operation when the disk drive interface (not shown) receives an instruction to move the head to a new track. Seek Length decision block 102 determines whether the movement entails a short seek or a long seek. This step corresponds to receipt by estimator 12 in FIG. 2 of a seek stroke signal. In the preferred embodiment, a movement entails a long seek if the desired or target position of the head is at least 64 tracks away from the initial position.

When Seek Length decision block 102 determines that the seek is long, Gain block 104 sets the initial bias gain value to a high level, which enables the long seek operation to occur faster but also alters the scale of X3. The physical process of executing the seek operation then occurs at Long Seek block 106. Settle decision block 108 determines whether settling has begun in the actuator on the basis of the initial settling value. When settle mode is detected, Gain block 10 restores the initial bias gain value to its original value and scales down X3 for later use. Physical settling occurs at Settle block 112, and the system queries at Seek decision block 114 whether the physical seek operation has been completed.

If Seek Length decision block 102 determines that the seek is short, then the estimation unit (estimator 12 in FIG. 2) obtains the initial bias value stored in the initial bias value storage unit 30 and loads it as the current X3. The physical execution of the short seek operation occurs at Short Seek block 118, during which time the system queries in Seek decision block 120 whether the physical process has finished.

When the physical operation is done (i.e., the physical short seek has finished or the head actuator has settled sufficiently to begin track following), Save block 122 stores the current value of X3 in the initial bias value storage unit register as the updated initial bias value. The seek operation then terminates at End block 124.

As mentioned above, the present invention provides a servo control device with the advantage of utilizing a minimal bias table (for example, only one word in length) when performing disturbance compensation for servo control. Moreover, the present invention omits an initial calculation process when performing compensation for short seek operations, thereby permitting rapid response in short seeks.

What is claimed is:

1. An apparatus, comprising:
    a storage unit having a plurality of tracks storing information, said plurality of tracks including at least a first track and a separately located second track;
    a data transfer head transferring the information to or from said plurality of tracks;
    a control unit controlling a movement of said data transfer head from a first position over said first track to a separately located second position over said second track, said control unit further comprising:
        a detector determining when said movement of said data transfer head corresponds to a long seek, said movement corresponding to said long seek when said first track is separated from said second track by more than a predetermined quantity of said tracks of said storage unit, said detector outputting a mode signal corresponding to said determination of said detector;
        a memory unit storing one bias value initially corresponding to first compensation data reducing delay of said movement of said data transfer head and subsequently corresponding to a current position of said data transfer head;
        an estimator unit being functionally coupled to said memory unit and said detector, and:
            when said mode signal does not correspond to said long seek, said estimator unit controlling said movement in dependence upon said first compensation data stored in said memory unit to reduce delay of said movement; and
            when said mode signal does correspond to said long seek, said estimator unit generating second compensation data reducing delay of said movement of said data transfer head, said estimator unit controlling said movement in dependence upon said second compensation data to reduce delay of said movement and independently of said first compensation data stored in said memory unit; and
        said apparatus requiring a minimal storage capacity storing only one bias value at any one time.

2. The apparatus of claim 1, said estimator unit generating said second compensation data in dependence upon a position estimation value representative of said current position of said data transfer head.

3. The apparatus of claim 2, said estimator unit reading said first compensation data from said memory unit and not generating said second compensation data, when said mode signal does not correspond to said long seek.

4. The apparatus of claim 3, further comprising a head actuator operationally coupling said control unit to said data transfer head.

5. The apparatus of claim 4, said storage unit corresponding to a magnetic storage disk drive operating in conjunction with one or more storage disks.

6. The apparatus of claim 5, further comprising a switch connecting said memory unit with said estimator unit and receiving said mode signal and responding in accordance with said mode signal,
said switch closing when said mode signal does not correspond to said long seek,
said estimator unit obtaining said first compensation data from said memory unit through said switch when said mode signal does not correspond to said long seek.

7. The apparatus of claim 2, said estimator unit increasing an internal bias gain value from an original value to an increased value and generating said second compensation data in correspondence with said increased value when said mode signal corresponds to said long seek.

8. The apparatus of claim 7, said estimator unit using said second compensation data as an initial settling value when said mode signal corresponds to said long seek.

9. The apparatus of claim 8, said estimator unit determining in accordance with said initial settling value whether said data transfer head has started to settle and restoring said internal bias gain value from said increased value to said original value when said data transfer head has started to settle.

10. The apparatus of claim 9, said estimator unit reading said first compensation data from said memory unit and not generating said second compensation data, when said mode signal does not correspond to said long seek.

11. The apparatus of claim 10, further comprising a head actuator operationally coupling said control unit to said data transfer head.

12. The apparatus of claim 11, said storage unit corresponding to a magnetic storage disk drive operating in conjunction with one or more storage disks.

13. The apparatus of claim 9, further comprising a head actuator operationally coupling said control unit to said data transfer head.

14. The apparatus of claim 13, said storage unit corresponding to a magnetic storage disk drive operating in conjunction with one or more storage disks.

15. The apparatus of claim 14, further comprising a switch connecting said memory unit with said estimator unit and receiving said mode signal and responding in accordance with said mode signal,
said switch closing when said mode signal does not correspond to said long seek,
said estimator unit obtaining said first compensation data from said memory unit through said switch when said mode signal does not correspond to said long seek.

16. The apparatus of claim 8, said estimator unit reading said first compensation data from said memory unit and not generating said second compensation data, when said mode signal does not correspond to said long seek.

17. The apparatus of claim 16, further comprising a head actuator operationally coupling said control unit to said data transfer head.

18. The apparatus of claim 17, said storage unit corresponding to a magnetic storage disk drive operating in conjunction with one or more storage disks.

19. The apparatus of claim 18, further comprising a switch connecting said memory unit with said estimator unit and receiving said mode signal and responding in accordance with said mode signal,
said switch closing when said mode signal does not correspond to said long seek,
said estimator unit obtaining said first compensation data from said memory unit through said switch when said mode signal does not correspond to said long seek.

20. The apparatus of claim 18, said predetermined quantity of said tracks corresponding to 64.

21. The apparatus of claim 18, said predetermined quantity of said tracks corresponding to a number between 32 and 256.

22. The apparatus of claim 18, said predetermined quantity of said tracks corresponding to a number between 32 and 128.

23. The apparatus of claim 18, said predetermined quantity of said tracks is over 32.

24. The apparatus of claim 8, further comprising a head actuator operationally coupling said control unit to said data transfer head.

25. The apparatus of claim 24, said storage unit corresponding to a magnetic storage disk drive operating in conjunction with one or more storage disks.

26. The apparatus of claim 25, further comprising a switch connecting said memory unit with said estimator unit and receiving said mode signal and responding in accordance with said mode signal,
said switch closing when said mode signal does not correspond to said long seek,
said estimator unit obtaining said first compensation data from said memory unit through said switch when said mode signal does not correspond to said long seek.

27. The apparatus of claim 7, said estimator unit reading said first compensation data from said memory unit and not generating said second compensation data, when said mode signal does not correspond to said long seek.

28. The apparatus of claim 27, further comprising a head actuator operationally coupling said control unit to said data transfer head.

29. The apparatus of claim 28, said storage unit corresponding to a magnetic storage disk drive operating in conjunction with one or more storage disks.

30. The apparatus of claim 29, further comprising a switch connecting said memory unit with said estimator unit and receiving said mode signal and responding in accordance with said mode signal,
said switch closing when said mode signal does not correspond to said long seek,
said estimator unit obtaining said first compensation data from said memory unit through said switch when said mode signal does not correspond to said long seek.

31. The apparatus of claim 7, further comprising a head actuator operationally coupling said control unit to said data transfer head.

32. The apparatus of claim 31, said storage unit corresponding to a magnetic storage disk drive operating in conjunction with one or more storage disks.

33. The apparatus of claim 32, further comprising a switch connecting said memory unit with said estimator unit and receiving said mode signal and responding in accordance with said mode signal,
said switch closing when said mode signal does not correspond to said long seek,
said estimator unit obtaining said first compensation data from said memory unit through said switch when said mode signal does not correspond to said long seek.

34. The apparatus of claim 2, further comprising a head actuator operationally coupling said control unit to said data transfer head.

35. The apparatus of claim 34, said storage unit corresponding to a magnetic storage disk drive operating in conjunction with one or more storage disks.

36. The apparatus of claim 35, further comprising a switch, said switch connecting said memory unit with said estimator unit, said switch receiving said mode signal and responding in accordance with said mode signal, said switch closing when said mode signal does not correspond to said long seek, said estimator unit obtaining said first compensation data from said memory unit through said switch when said mode signal does not correspond to said long seek.

37. The apparatus of claim 1, further comprising a head actuator operationally coupling said control unit to said data transfer head.

38. The apparatus of claim 37, said storage unit corresponding to a magnetic storage disk drive.

39. A method controlling a displacement of a data transfer head that responds to a bias force and generates position information, said method comprising the steps of:

receiving a mode signal indicating when said displacement corresponds to a long displacement;

when said mode signal indicates that said displacement does not correspond to said long displacement, producing a first disturbance estimation value in dependence upon an initial bias value stored in a memory unit and corresponding to a current position of said data transfer head, and controlling said displacement according to said first disturbance estimation value, said first disturbance estimation value reducing delay of said displacement of said data transfer head;

when said mode signal indicates that said displacement does correspond to said long displacement, producing a second disturbance estimation value independently of said initial bias value stored in said memory unit and controlling said displacement according to said second disturbance estimation value and independently of said first disturbance estimation value, said second disturbance estimation value reducing delay of said displacement of said data transfer head; and requiring a minimal storage capacity storing only one bias value at any one time.

40. The method of claim 39, further comprising the step of producing said second disturbance estimation value in dependence upon a position estimation value representative of said current position of said data transfer head when said mode signal indicates that said displacement corresponds to said long displacement.

41. The method of claim 40, wherein said step of producing said first disturbance estimation value when said mode signal indicates that said displacement does not correspond to said long displacement includes using said initial bias value as said disturbance estimation value.

42. The method of claim 41, wherein said step of producing said second disturbance estimation value when said mode signal indicates that said displacement corresponds to said long displacement includes increasing an internal bias gain value from an original value to an increased value and producing said disturbance estimation value in correspondence with said increased value.

43. The method of claim 42, further comprising the step of using said second disturbance estimation value as an initial settling value when said mode signal indicates that said displacement corresponds to said long displacement.

44. The method of claim 43, further comprising the step of determining in accordance with said initial settling value whether said data transfer head has started to settle and restoring said internal bias gain value from said increased value to said original value when said data transfer head has started to settle.

45. The method of claim 44, further comprising a head actuator being coupled to said data transfer head and operating in a mass storage device, said displacement being a data transfer head movement operation.

46. The method of claim 45, said mass storage device being a magnetic storage disk drive operating in conjunction with one or more storage disks and each of said storage disks includes a plurality of data tracks disposed circumferentially on a surface of said storage disk.

47. The method of claim 46, said data transfer head movement operation corresponding to said long displacement when said data transfer head movement operation includes moving said head actuator across at least a predetermined number of data tracks.

48. The method of claim 47, said predetermined number of data tracks being a number between 32 and 256.

49. The method of claim 47, said predetermined number of data tracks being a number between 32 and 128.

50. The method of claim 47, said predetermined number of data tracks being 64.

51. In a hard disk drive, an apparatus controlling an actuator executing a head movement operation, said apparatus comprising:

an actuator generating position information;

a data transfer head being coupled to said actuator, said data transfer head being moved from a first position to a separately located second position in accordance with said actuator executing said head movement operation;

a memory unit updating an initial bias value with a bias value corresponding to a current position of said actuator, said memory unit storing only one bias value at any one time, said memory unit being coupled to said actuator;

an estimation unit performing an estimation of said current position, a velocity corresponding to said current position, and a disturbance corresponding to said current position;

said performing of said estimation in response to a long seek command, said long seek command corresponding to a long distance between said first and second positions, comprising:

increasing an internal bias gain value from an original value to an increased value;

producing a disturbance estimation value corresponding to said increased value;

using said disturbance estimation value as an initial settling value and not using said initial bias value stored in said memory unit as said initial settling value; and restoring said internal bias gain value from said increased value to said original value when settling has started;

said performing of said estimation in response to a short seek command, said short seek command corresponding to a short distance between said first and second positions shorter than said long distance, comprising:

using said initial bias value stored in said memory unit from a previous head movement operation as said initial settling value.

52. In a hard disk drive, a method controlling an actuator executing a head movement operation by making an estimation of a current position, velocity, and disturbance using a bias memory unit, said method comprising the steps of:

determining whether said head movement operation corresponds to a long seek stroke in dependence upon a seek stroke signal;

executing a long seek stroke mode when said head movement operation corresponds to a long seek stroke, said long seek stroke mode comprising:
  increasing an internal bias gain value from an original value to an increased value;
  producing a disturbance estimation value corresponding to said internal bias gain value;
  using said disturbance estimation value as an initial settling value and not using a previously-stored initial bias value as said initial settling value; and
  storing a bias value in a bias memory unit, said bias value corresponding to said current position as an initial bias value; and executing a short seek stroke mode when said head movement operation does not correspond to a long seek stroke, said short seek stroke mode comprising:
  using said previously-stored initial bias value as said initial settling value; and
  storing a bias value in said bias memory unit corresponding to said current position as said initial bias value, said bias memory unit storing only one bias value at any one time.

* * * * *